United States Patent
Cornelius et al.

(10) Patent No.: US 7,358,206 B2
(45) Date of Patent: Apr. 15, 2008

(54) UV TRANSMITTING GLASSES

(75) Inventors: Lauren Kay Cornelius, Painted Post, NY (US); Adam James Gillmar Ellison, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/433,180

(22) Filed: May 12, 2006

(65) Prior Publication Data

US 2007/0265155 A1    Nov. 15, 2007

(51) Int. Cl.
*C03C 3/091* (2006.01)
(52) U.S. Cl. .............................. 501/66; 501/77; 501/59
(58) Field of Classification Search .................. 501/59
See application file for complete search history.

(56) References Cited

U.S. PATENT DOCUMENTS

| | | | | |
|---|---|---|---|---|
| 3,671,380 A | | 6/1972 | Ali et al. ..................... 161/175 |
| 3,779,781 A | * | 12/1973 | Baak et al. ..................... 501/54 |
| 4,063,001 A | * | 12/1977 | Zlochower .................. 428/410 |
| 4,367,012 A | * | 1/1983 | Ikeda et al. .................. 385/144 |
| 4,792,535 A | * | 12/1988 | Fine ............................. 501/66 |
| 4,870,034 A | | 9/1989 | Kiefer .......................... 501/66 |
| 4,913,518 A | | 4/1990 | Fine ......................... 350/96.29 |
| 5,547,904 A | | 8/1996 | Watzke et al. ................. 501/66 |
| 5,599,753 A | | 2/1997 | Watzke et al. ................. 501/66 |
| 5,610,108 A | * | 3/1997 | Watzke et al. ................. 501/59 |
| 5,747,398 A | * | 5/1998 | Higby et al. ................... 501/66 |
| 6,180,218 B1 | * | 1/2001 | Fyles et al. .................. 428/220 |
| 6,436,858 B1 | * | 8/2002 | Laborde et al. ............... 501/67 |
| 7,217,673 B2 | * | 5/2007 | Naumann et al. ............. 501/66 |
| 2003/0087743 A1 | | 5/2003 | Peuchert et al. .............. 501/66 |
| 2007/0213195 A1 | * | 9/2007 | Hikata et al. .................. 501/67 |

FOREIGN PATENT DOCUMENTS

WO    WO 02/081394    * 10/2002

* cited by examiner

*Primary Examiner*—J. A. Lorengo
*Assistant Examiner*—Pegah Parvini
(74) *Attorney, Agent, or Firm*—Robert P. Santandrea; Timothy M. Schaeberle

(57) ABSTRACT

The present invention relates to a boroaluminosilicate glass which exhibits excellent UV transmission. In particular, the present invention is directed at an alkali fluorine-doped boroaluminosilicate glass comprising, in mole percent on the oxide basis, of 30-80% $SiO_2$, 1-20% $Al_2(O, F_2)_3$, 5-35% $B_2O_3$, 5-20% $R_2O$, where R is Li, Na, K, Rb or Cs, and an amount of up to 12% of F. The glass possesses an R/Al molar ratio of between 0.4 to 3 and an F/O molar ratio of no greater than 0.35. The alkali fluorine-doped boroaluminosilicate glass of the present invention exhibits a UV transmission at 300 nm, of greater than 80%/mm.

7 Claims, 2 Drawing Sheets

UV TRANSMITTING GLASSES

BACKGROUND OF THE INVENTION

1. Field of the Invention

The present invention relates generally to boroaluminosilicate glasses. More specifically, the invention relates to an alkali fluorine-doped boroaluminosilicate glasses which exhibit excellent UV transmission.

2. Technical Background

Glasses capable of transmitting well in the ultraviolet are rare, and those that do so are difficult to fabricate. For example, extraordinary UV transmission can be obtained in silica prepared by a chemical vapor deposition process (e.g., the direct process or various types of soot/preform processes), but such processes are very expensive with regard to raw materials (e.g., octamethylcyclotetrasilane or $SiCl_4$). Additionally, other shortcomings of these fused silica manufacturing processes include low yields, as well as the difficulty in tailoring the process so as to be a continuous manufacturing process.

It is well known that certain fluoride glasses, e.g., beryllium fluoride, exhibit excellent UV transmission, however these glasses also have certain problems associated with their manufacture; specifically the toxicity of the elements involved, materials handling problems associated with fluorine, the need for controlled melting atmospheres, limited working ranges that interfere with precision casting, etc.

Fluoride crystals, like fused silica and fluoride glasses, exhibit excellent UV transmission, but also present very difficult manufacturing challenges; particularly, the difficulty in scaling up the process to produce large parts. In certain applications, such as LCD lithography, the need for deep UV transmission is less critical than the need for large, high quality parts, and thus crystalline materials, given this difficulty in scaling up the process to produce large parts, would be totally impractical for such applications.

Furthermore, it is often desirable to be able to take advantage of the refractive indices or dispersion characteristics of two or more optical materials to minimize chromatic aberration, vary focal length, etc. Many glasses are available for such combinations for visible applications, but as above, the number of materials with distinctive indices or suitable transmission in the UV is quite small. Were such materials required for large-scale applications, the only practical material would be high-purity fused silica, and therefore color correction and so on is simply not an option using conventional optical approaches.

As such there is a need in the lithography industry for a glass or suite of glasses with the desirable UV transmission of, for example, fluoride glasses, but with the ease of melting and forming of conventional oxide glasses. These glasses would necessarily be made using high purity materials and high-purity melting methods, and so a ready supply of comparatively inexpensive raw materials and a relatively inexpensive melting method would be highly desirable. The instant invention is directed at glasses which fulfill this need.

SUMMARY OF THE INVENTION

The present invention relates to a boroaluminosilicate glass which exhibits excellent UV transmission. In particular, the present invention is directed at an alkali fluorine-doped boroaluminosilicate glass comprising, in mole percent on the oxide basis, of 30-80% $SiO_2$, 1-20% $Al_2(O, F_2)_3$, 5-35% $B_2O_3$, 5-20% $R_2O$, where R is Li, Na, K, Rb or Cs, and up to 12% of F. The glass possesses an R/Al molar ratio of between 0.4 to 3 and an F/O molar ratio of no greater than 0.35. The alkali fluorine-doped boroaluminosilicate glass of the present invention exhibits a UV transmission at 300 nm, of greater than 80%/mm.

In another embodiment the alkali fluorine-doped boroaluminosilicate glass of the present invention exhibits a UV transmission at 250 nm, of greater than 50%/mm.

In a still further embodiment the alkali fluorine-doped boroaluminosilicate glass of the present invention exhibits a UV transmission at 200 nm, of greater than 50%/mm.

The UV transmitting boroaluminosilicate glasses of the present invention provides a number of advantages over prior art UV transmitting glasses; particularly fused silica/fluoride glasses and fluoride crystals. For example, these inventive boroaluminosilicate glasses can be prepared from readily-procured raw materials and can be melted, cast and formed using variants on conventional melting methods. Furthermore, the instant boroaluminosilicate glasses are extremely stable against devitrification, and therefore can be formed or sagged into final shape. Finally, these inventive glasses also can be manufactured in a continuous or steady-state high-viscosity melting and forming process, for example, a continuous unit (non-batch) melter, and thereafter formed into sheet or ribbon or formed using a fusion draw process.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying figures are included to provide a further understanding of the invention, and are incorporated in and constitute a part of this specification. The figures illustrate one or more embodiment(s) of the invention, and together with the description serve to explain the principles and operation of the invention.

DETAILED DESCRIPTION OF THE INVENTION

Figure 1:
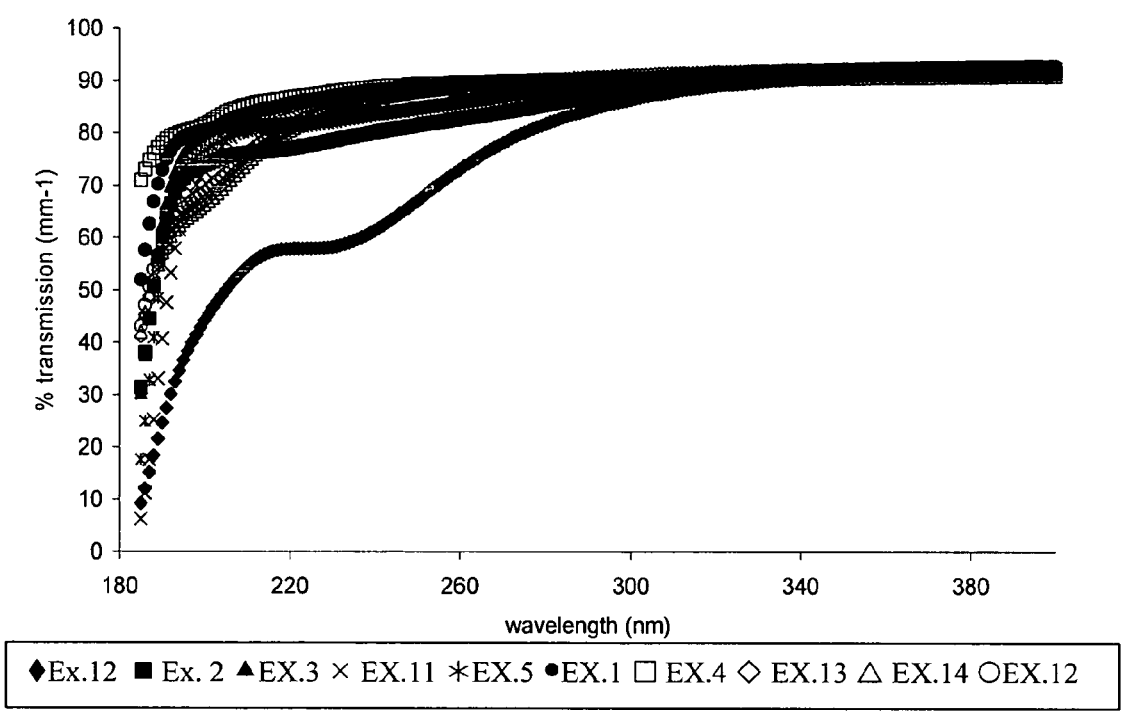
FIG. 1 is a graph illustrating the bulk UV transmission spectra of a number of inventive boroaluminosilicate glass samples made according to one the present invention.

The present invention is based on the discovery of a family of boroaluminosilicate compositions that can produce glasses of excellent stability and which exhibit excellent UV transmission below 400 nm.

The present inventive fluorine-doped alkali boroaluminosilicate exhibits a base glass composition comprising, in mole percent on the oxide basis, of 30-80% $SiO_2$, 1-20%, 5-35% $B_2O_3$, 5-20% $R_2O$, where R is Li, Na, K, Rb or Cs, and an amount of up to 12% of F. The glass possesses an R/Al molar ratio between 0.4 to 3 and an F/O molar ratio no greater than 0.35. Lastly, the glass should contain a total amount of transition metals, particularly Ti, V, Cr, Mn, Fe, Co, Ni, Cu, of less than 100 ppm.

Further, as discussed below in detail, the inventors have found that the boroaluminosilicate glass compositions according to certain embodiments of the present invention can have advantageous UV transmitting properties; particularly at wavelengths of less than 400 nm. In particular, alkali fluorine-doped of the present invention exhibit a UV transmission at 300 nm, of greater than 80%/mm. In another embodiment, a UV transmission at 250 nm of greater than 50%/mm. In still another embodiment, a UV transmission at 200 nm of greater than 50%/mm. These UV transmitting properties enable the use of the instant boroaluminosilicate glass in certain lithography applications, such as in LCD lithography as glass substrates for LCD Imagemasks suitable for making color filters and TFTs. Additionally, when incorporated into certain lensing systems and utilized in combination with other UV transmitting materials, such as monolithic $CaF_2$ and fused silica, as well as fluoride glass, these inventive alkali fluorine-doped boroaluminosilicate glasses function to provide to the lensing system features such as color correction or lens focusing.

It is generally desired that the alkali metal utilized in the glass be potassium due to the fact that it produces the lowest refractive index of the various alkali choices when added in the preferred/equivalent amounts. This is desirable because the refractive index (ranging between 1.44 and 1.54) is a direct reflection of the UV absorption cutoff of the glass and a lower index implies deeper UV cutoff and better UV transparency.

The most preferred composition range, for best transmission, is based on a composition consisting essentially, in mole percent on an oxide basis, of: 55-80% $SiO_2$, 3-12.5% $Al_2(O, F_2)_3$, and 5-20 $B_2O_3$, and 7.5-20% $R_2O$.

It is not necessary to include F in the glass composition to achieve acceptable UV transmission characteristic, however it's inclusion is desired as it has the effect of improving both the melting and forming characteristics. Also, it should be noted that at high concentrations the fluorine does serve to improve the glass's UV transmission. Fluoride amounts up to 12% by mole can be added, however amounts greater than 12% are undesirable as this can lead to glasses that experience phase separation and devitrification.

In one embodiment the R/Al molar ratio is between 0.7 to 1.5 and the F/O molar ratio no greater than 0.20

In a still further embodiment the boroaluminosilicate glass of the present invention exhibits F/O molar ratio which ranges between 0.05 and 0.35.

Optional constituents, listed in mole percent on the oxide basis, that can be included in the inventive glass, are as follows: 0-1% Cl or Br. Addition of Cl or Br at these low levels aid in glass melting, as well as providing a glass contaminant reducing effect, however levels higher than 1% tend to negatively effect UV transmission, and are thus undesirable.

The glasses are prepared from readily-procured raw materials and can be melted, cast and formed using variants on conventional melting methods. The glasses are extremely stable against devitrification, and therefore can be formed or sagged into final shape, and are also compatible with a continuous or steady-state high-viscosity melting and forming process, for example, CU melting and forming into sheet or ribbon using a fusion draw.

EXAMPLES

Examples 1-82

The invention will be further clarified by the following examples set forth in Table I. Disclosed therein are a number of glass compositions, expressed in terms of mole percent on the oxide basis, illustrating the parameters of the present invention. The Table also presents the potassium to alumina molar ratio (K/Al), the fluorine to oxygen molar ratio, as well as the 50%/cm transmission wavelength cutoff, exhibited by a number of the resulting glasses. It should be noted that the transmission measured for these exemplary samples was the bulk transmission; as measured for prisms having polished parallel faces 1 mm apart and as measured by a Cary UV Visible Spectrometer Model No. 5G. It should also be noted that the bulk transmission measure reported does not include any reflectance correction.

The batch ingredients for preparing glasses falling within the inventive composition ranges may comprise any materials, either the oxides or other compounds, which, upon being melted together, will be converted into the desired oxide in the proper proportions.

The exemplary glasses were produced in the following manner. The batch materials were compounded, mixed together to assist in securing a homogeneous melt, and then placed into preferably refractory, fused silica, or platinum crucibles. If refractory crucibles were used, it was preferred that the material be as dense as reasonably achievable and as free from contamination as possible. The crucibles were introduced into a furnace operating at temperatures of 1325°-1550° C., and the batches were melted for periods ranging between 4-16 hours; higher temperatures were generally required for glasses with high $SiO_2$ contents, low $B_2O_3$ contents, low fluorine contents, or combinations thereof. It should be noted that fused quartz liners were utilized at melt temperatures greater than about 1450° C. The melt was poured as free "patties" exhibiting a thickness of about 2 cm and thereafter transferred to an annealer operating at about 375-500° C. These patties were then formed into the aforementioned prisms for transmission measurement.

UV transmission spectra of 1 mm thick samples (no reflectance correction) are shown in FIG. 1; same spectrometer with no correction. An examination of FIG. 1 reveals that all the samples measured and plotted exhibit an internal UV transmission at 300 nm of at least 80%/mm, and more specifically, an internal transmission of greater than 50%/mm at 250 nm.

TABLE 1

| Sample No. | $SiO_2$ | $B_2O_3$ | $Al_2O_3$ | $Al_2F_6$ | $K_2O$ | K/AL | F/O | Melt Temp (° C.) | 50% T wavelength |
|---|---|---|---|---|---|---|---|---|---|
| 1 | 70 | 10 | 5 | 5 | 10 | 1 | 0.153846 | 1525 | <185 |
| 2 | 60 | 18 | 6 | 5 | 11 | 1 | 0.147783 | 1525 | 187-188 |
| 3 | 60 | 18 | 6 | 5 | 11 | 1 | 0.147783 | 1525 | 187-188 |
| 4 | 75 | 10 | 2.5 | 5 | 7.5 | 1 | 0.153846 | 1525 | <185 |

TABLE 1-continued

| | SiO2 | B2O3 | Al2O3 | Al2F6 | K2O | K/AL | F/O | Temp, C. | |
|---|---|---|---|---|---|---|---|---|---|
| 5 | 65 | 10 | 7.5 | 5 | 12.5 | 1 | 0.153846 | 1525 | 188-190 |
| 6 | 55 | 13 | 7 | 5 | 20 | 1.666667 | 0.157895 | 1450 | 190-191 |
| 7 | 65 | 13 | 5 | 2 | 15 | 2.142857 | 0.060302 | 1450 | 196-197 |
| 8 | 60 | 18 | 3 | 2 | 17 | 3.4 | 0.06 | 1450 | 203-204 |
| 9 | 60 | 18 | 4.6 | 2 | 15.4 | 2.333333 | 0.059055 | 1450 | 197 |
| 10 | 60 | 18 | 6.6 | 0 | 15.4 | 2.333333 | 0 | 1450 | 208-209 |
| 11 | 60 | 10 | 10 | 5 | 15 | 1 | 0.153846 | 1525 | 191-192 |
| 12 | 57 | 21 | 7.5 | 5 | 9.5 | 0.76 | 0.143541 | 1450 | 186-187 |
| 13 | 60 | 18 | 7.5 | 5 | 9.5 | 0.76 | 0.145631 | 1450 | 187-188 |
| 14 | 63 | 15 | 7.5 | 5 | 9.5 | 0.76 | 0.147783 | 1450 | 187-188 |
| 15 | 60 | 18 | 7.5 | 5 | 9.5 | 0.76 | 0.145631 | 1450 | 226-227 |
| 16 | 65 | 13 | 7 | 0 | 15 | 2.142857 | 0 | 1450 | |
| 17 | 60 | 18 | 5 | 10.4 | 6.6 | 0.428571 | 0.319018 | 1450 | |
| 18 | 60 | 18 | 10.4 | 5 | 6.6 | 0.428571 | 0.141643 | 1450 | |
| 19 | 60 | 18 | 10.4 | 5 | 6.6 | 0.428571 | 0.141643 | 1525 | |
| 20 | 57 | 21 | 7.5 | 5 | 9.5 | 0.76 | 0.143541 | 1525 | |
| 21 | 60 | 18 | 7.5 | 5 | 9.5 | 0.76 | 0.145631 | 1525 | |
| 22 | 60 | 18 | 10.5 | 2 | 9.5 | 0.76 | 0.055814 | 1450 | |
| 23 | 60 | 13 | 11 | 4 | 12 | 0.8 | 0.117647 | 1450 | |
| 24 | 60 | 18 | 6.6 | 5 | 10.4 | 0.896552 | 0.146915 | 1450 | |
| 25 | 60 | 18 | 6.6 | 5 | 10.4 | 0.896552 | 0.146915 | 1525 | |
| 26 | 60 | 18 | 9.6 | 2 | 10.4 | 0.896552 | 0.056285 | 1450 | |
| 27 | 60 | 18 | 9.6 | 2 | 10.4 | 0.896552 | 0.056285 | 1525 | |
| 28 | 60 | 18 | 2 | 9 | 11 | 1 | 0.282723 | 1450 | |
| 29 | 70 | 10 | 5 | 5 | 10 | 1 | 0.153846 | 1450 | |
| 30 | 60 | 18 | 6 | 5 | 11 | 1 | 0.147783 | 1450 | |
| 31 | 60 | 18 | 6 | 5 | 11 | 1 | 0.147783 | 1450 | |
| 32 | 65 | 13 | 6 | 5 | 11 | 1 | 0.151515 | 1450 | |

| | SiO2 | B2O3 | Al2O3 | Al2F6 | K2O | K/AL | F/O | Temp, C. |
|---|---|---|---|---|---|---|---|---|
| 33 | 60 | 18 | 7 | 4 | 11 | 1 | 0.116505 | 1450 |
| 34 | 65 | 10 | 7.5 | 5 | 12.5 | 1 | 0.153846 | 1450 |
| 35 | 60 | 13 | 8.5 | 5 | 13.5 | 1 | 0.151515 | 1450 |
| 36 | 60 | 18 | 9 | 2 | 11 | 1 | 0.056604 | 1450 |
| 37 | 60 | 10 | 10 | 5 | 15 | 1 | 0.153846 | 1450 |
| 38 | 55 | 13 | 11 | 5 | 16 | 1 | 0.151515 | 1450 |
| 39 | 55 | 10 | 12.5 | 5 | 17.5 | 1 | 0.153846 | 1450 |
| 40 | 55 | 10 | 10 | 5 | 20 | 1.333333 | 0.157895 | 1450 |
| 41 | 60 | 10 | 5 | 5 | 20 | 2 | 0.162162 | 1450 |
| 42 | 60 | 18 | 1.6 | 5 | 15.4 | 2.333333 | 0.15448 | 1450 |
| 43 | 60 | 18 | 5 | 1.6 | 15.4 | 2.333333 | 0.046967 | 1450 |
| 44 | 60 | 13 | 5 | 2 | 20 | 2.857143 | 0.061856 | 1450 |
| 45 | 60 | 18 | 0 | 5 | 17 | 3.4 | 0.157068 | 1450 |
| 46 | 65 | 10 | 0 | 5 | 20 | 4 | 0.166667 | 1450 |
| 47 | 65 | 10 | 5 | 0 | 20 | 4 | 0 | 1450 |
| 48 | 70 | 10 | 5 | 5 | 10 | 1 | 0.153846 | 1525 |
| 49 | 75 | 10 | 7.5 | 0 | 7.5 | 1 | 0 | 1525 |
| 50 | 60 | 18 | 9 | 2 | 11 | 1 | 0.056604 | 1525 |
| 51 | 65 | 10 | 10 | 5 | 15 | 1 | 0.146341 | 1525 |
| 52 | 70 | 10 | 10 | 0 | 10 | 1 | 0 | 1525 |
| 53 | 65 | 10 | 12.5 | 0 | 12.5 | 1 | 0 | 1525 |
| 54 | 60 | 10 | 15 | 0 | 15 | 1 | 0 | 1525 |
| 55 | 55 | 13 | 7 | 5 | 20 | 1.666667 | 0.157895 | 1525 |
| 56 | 65 | 13 | 5 | 2 | 15 | 2.142857 | 0.060302 | 1525 |
| 57 | 65 | 13 | 5 | 2 | 15 | 2.142857 | 0.060302 | 1525 |
| 58 | 60 | 18 | 4.6 | 2 | 15.4 | 2.333333 | 0.059055 | 1525 |
| 59 | 60 | 18 | 6.6 | 0 | 15.4 | 2.333333 | 0 | 1525 |
| 60 | 75 | 20 | 0 | 2.6 | 2.4 | 0.923077 | 0.073446 | 1525 |
| 61 | 74 | 15 | 0 | 5.1 | 4.9 | 0.960784 | 0.154624 | 1525 |
| 62 | 75 | 10 | 0 | 7.6 | 7.4 | 0.973684 | 0.24333 | 1525 |
| 63 | 75 | 10 | 3.8 | 3.8 | 7.4 | 0.973684 | 0.114688 | 1525 |
| 64 | 75 | 10 | 7.6 | 0 | 7.4 | 0.973684 | 0 | 1525 |
| 65 | 75 | 5 | 0 | 10.1 | 9.9 | 0.980198 | 0.346484 | 1525 |
| 66 | 75 | 0 | 0 | 12.6 | 12.4 | 0.984127 | 0.465517 | 1525 |
| 67 | 72 | 13 | 0 | 7.5 | 7.5 | 1 | 0.23622 | 1525 |
| 68 | 72 | 13 | 0 | 7.5 | 7.5 | 1 | 0.23622 | 1525 |
| 69 | 75 | 10 | 0 | 7.5 | 7.5 | 1 | 0.24 | 1525 |
| 70 | 75 | 10 | 0 | 7.5 | 7.5 | 1 | 0.24 | 1525 |
| 71 | 77 | 8 | 0 | 7.5 | 7.5 | 1 | 0.242588 | 1575 |
| 72 | 77 | 8 | 0 | 7.5 | 7.5 | 1 | 0.242588 | 1575 |
| 73 | 72 | 13 | 2.5 | 5 | 7.5 | 1 | 0.151515 | 1575 |
| 74 | 72 | 13 | 2.5 | 5 | 7.5 | 1 | 0.151515 | 1575 |
| 75 | 75 | 10 | 2.5 | 5 | 7.5 | 1 | 0.153846 | 1575 |
| 76 | 75 | 10 | 2.5 | 5 | 7.5 | 1 | 0.153846 | 1575 |
| 77 | 75 | 10 | 2.5 | 5 | 7.5 | 1 | 0.153846 | 1575 |
| 78 | 77 | 8 | 2.5 | 5 | 7.5 | 1 | 0.15544 | 1575 |
| 79 | 77 | 8 | 2.5 | 5 | 7.5 | 1 | 0.15544 | 1575 |

TABLE 1-continued

| 80 | 70 | 10 | 3.33 | 6.67 | 10 | 1 | 0.210643 | 1575 |
| 81 | 65 | 10 | 4.17 | 8.33 | 12.5 | 1 | 0.270148 | 1575 |
| 82 | 70 | 10 | 5 | 5 | 10 | 1 | 0.153846 | 1575 |

Example 83

In the manner similar to that described above for forming Examples 1-82, an inventive alkali fluorine-doped boroaluminosilicate glass was formed of the following composition, in mole percent on the oxide basis: 70% $SiO_2$, 1.1% $Al_2O_3$, 18% $B_2O_3$, 5.9% $K_2O$, and 5% $Al_2F_6$. The batch material and amounts utilized for forming this glass are listed below in Table 2. Alternatives to the raw materials indicated in Table 3 include alkali fluorides instead of aluminum fluoride, powdered materials produced via a sol-gel or flame hydrolysis process, and other materials that would be obvious to those skilled in the art of glass fabrication. The batch materials were handled using scoops and containers that had smooth, metal free surfaces, such as hard plastic. The batches were mixed aggressively in a sealed container on a roller or a mechanical mixture. If desired, the well-mixed batch materials can be calcined at low temperatures to decompose the boric acid and thus improve the fluorine retention; the calcination temperature can range between about 15-325° C. They were transferred to the crucible or lined melter using methods intended to minimize external contamination. An impermeable lid or crown was placed over the melt surface to minimize contamination during melting. The glass was delivered by pouring out of a crucible or delivery through an orifice into a roll, a mold, or a down draw process designed to produce a desirable final form factor.

TABLE 2

| BATCH COMPONENT | BATCH MATERIAL | WEIGHT (g) |
|---|---|---|
| $SiO_2$ | SYN-50 MINTECH milled HPFS | 923.4 |
| $B_2O_3$ | BORIC ACID, SQ food grade | 488.5 |
| $Al_2O_3$ | ALUMINA-Gamma | 24.6 |
| Al2F6 | ALUMINUM FLUORIDE, Nichimen | 184.4 |
| K2O | POTASSIUM CARBONATE | 179.0 |

The so-formed glass was again formed into prisms exhibiting parallel, polished faces. To obtain internal transmission for this Example 83 composition prism, two samples comprised of this composition were prepared with different parallel face thicknesses, and the transmission of both samples was measured utilizing a Cary Visible UV spectrometer, Model No % G. Thereafter, the absorption of the thinner prism sample was subtracted from that of the thicker prism sample to correct for internal reflection losses and errors in surface preparation, as represented by the following two equations:

$$\log A_{int} = 1/T_{int} \| A_{int} = A_{1cm} - A_{1mm} / 1 \text{ cm} - 1 \text{ mm},$$

where A is absorption and T is transmission.

Figure 2:
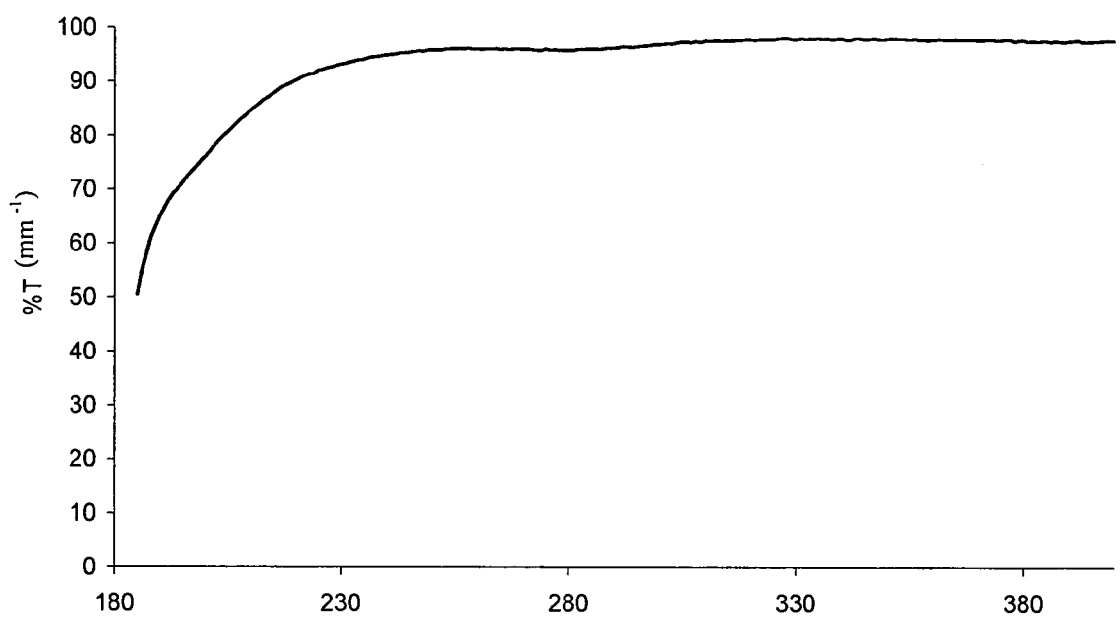
FIG. 2 is a graph illustrating the internal transmission of one inventive boroaluminosilicate glass embodiment made according to the present invention.

FIG. 2 is a graph that illustrates the internal transmission characteristic of this inventive alkali fluorine-doped boroaluminosilicate glass. The graph reveals that the inventive boroaluminosilicate glass example exhibits excellent UV transmission below the 400 nm wavelength. In particular, FIG. 2 reveals that the Example 83 transmittance is greater than 50%/mm at 200 nm (approx. 75%) and greater than 80%/mm at 300 nm (approx. 90%).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A boroaluminosilicate glass comprising, in mole percent on the oxide basis, of 30-80% $SiO_2$, 1-20%, $Al_2(O, F_2)_3$, 5-35% $B_2O_3$, 5-20% $R_2O$, at least 4.9% $K_2O$, where R is Li, Na, K, Rb or Cs, the glass exhibiting an R/Al molar ratio from 0.4 to 1, and optionally an amount of up to 12% of F, such that an F/O molar ratio is no greater than 0.35, and wherein the glass exhibits an internal UV transmission at 300 nm of at least 80%/mm.

2. The boroaluminosilicate glass of claim 1 having a cumulated amount of transition metals, selected from the group consisting of Ti, V, Cr, Mn, Fe, Co, Ni, Cu, of less than 100 ppm.

3. The boroaluminosilicate glass of claim 1 comprising, in mole percent on the oxide basis, 55-80% $SiO_2$, 3-12.5% $Al_2(O, F_2)_3$%, and 5-20 $B_2O_3$, and 7.5-20% $R_2O$.

4. The boroaluminosilicate glass of claim 3 wherein the F/O molar ratio no greater than 0.35.

5. The boroaluminosilicate glass of claim 3 wherein the glass exhibits an internal transmission of greater than 50%/mm at 250 nm.

6. The boroaluminosilicate glass of claim 3 wherein the glass exhibits an internal transmission of greater than 50%/mm at 200 nm.

7. The boroaluminosilicate glass of claim 1 wherein the F/O molar ratio ranges between 0.05 and 0.35.

* * * * *